United States Patent

Fujimoto et al.

Patent Number: 5,358,805
Date of Patent: Oct. 25, 1994

[54] SECONDARY BATTERY AND MANUFACTURING METHOD THEREFOR

[75] Inventors: Masahisa Fujimoto, Osaka; Noriyuki Yoshinaga, Sumoto; Koji Ueno, Higashi-osaka; Kazuro Moriwaki, Sumoto; Koji Nishio, Hirakata, all of Japan

[73] Assignee: Sanyo Electric Co., Ltd., Osaka, Japan

[21] Appl. No.: 21,242

[22] Filed: Feb. 23, 1993

[30] Foreign Application Priority Data

Apr. 9, 1992 [JP] Japan .................. 4-116926

[51] Int. Cl.$^5$ ............................................ H01M 10/40
[52] U.S. Cl. ................................. 429/218; 429/221; 429/223; 429/224
[58] Field of Search ............... 429/218, 221, 223, 224, 429/212

[56] References Cited

U.S. PATENT DOCUMENTS 5,139,901 8/1992 Kawaguchi et al. ............ 429/218
5,229,226 7/1993 Bito et al. ...................... 429/194

FOREIGN PATENT DOCUMENTS 3165463 7/1991 Japan .

Primary Examiner—Prince Willis, Jr.
Assistant Examiner—M. Nuzzolillo
Attorney, Agent, or Firm—Spensley Horn Jubas & Lubitz

[57] ABSTRACT

A secondary battery is comprised at a positive electrode, an electrolyte and a negative electrode which intercalates lithium reversibly. The negative electrode uses a carbon compound having a crystal structure of graphite in which carbon (C) is partially replaced by both boron (B) and nitrogen (N) and has the formula $BC_3N$ or in which (C) is partially replaced by boron (B) and has the formula $BC_3$. In the battery, the positive electrode may be a metal chalcogen or metal oxide, such as $FeS_2$, $MoS_2$, $TiS_2$, $LiNiO_2$, $LiMn_2O_3$, $LiFeO_2$, $LiCoO_2$ or $MnO_2$. The electrolyte may be a nonaqueous electrolyte or a solid electrolyte. The non-aqueous electrolyte uses an organic solvent and a lithium salt.

8 Claims, 2 Drawing Sheets

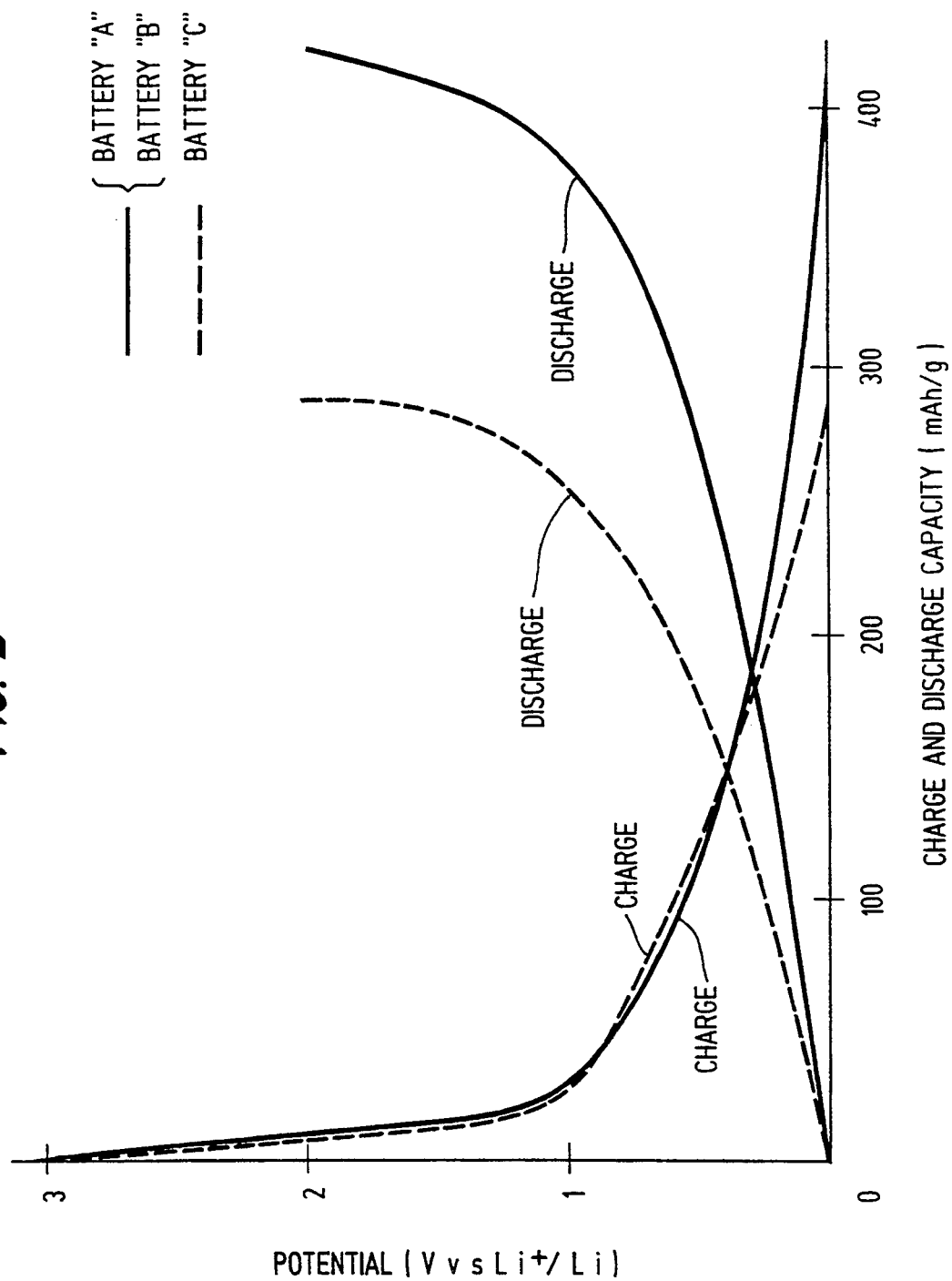

SECONDARY BATTERY AND MANUFACTURING METHOD THEREFOR

BACKGROUND OF THE INVENTION

1. Field of the Invention

This invention relates to a secondary battery using lithium as an active material, and further to an improvement of a negative electrode.

2. Description of the Prior Art

Currently, materials for use as a negative electrode in a secondary battery using lithium, which may be comprised of carbon compounds, including coke and the like, are tested for lithium metal content. The metals are tested because the carbon compounds have superior reversibility on charge-discharge cycles and substantially prevent electrical deposition from a mossy lithium on a surface of the negative electrode.

However, carbon compounds of coke or the like are not always a suitable material for the negative electrode. A long cycle life or a decrease of charging frequency do not always produce a sufficient discharge capacity. For example, ordinary materials such as coke have a electrical capacity of about 240 mAh/g. When using coke for the negative electrode to obtain an AA size secondary battery, the maximum capacity of the battery is about 350 mAh, or at most 400 mAh.

Research reported by YAMAGUCHI UNIV. and SENTRAL GLASS Co. discusses carbon compounds having the formula $BC_2N$. However, these carbon compounds includes comparatively high levels of nitrogen (N), and the conductivity of these carbon compounds is low. Therefore, carbon compounds need to be improved to be used as negative electrode materials.

SUMMARY OF THE INVENTION

Accordingly, a primary object of an embodiment of the present invention is to provide a secondary battery with improved battery characteristics, such as an improved discharge capacity.

Another object of an embodiment of the present invention is to provide a high capacity negative electrode for the battery.

Still another object of an embodiment of the present invention is to provide a manufacturing method for a battery with a high discharge capacity.

The above objects are fulfilled by an embodiment of a secondary battery comprising a positive electrode, an electrolyte and a negative electrode which is capable of intercalating lithium reversibly, wherein the negative electrode is a carbon compound having a crystal structure of a graphite, in which carbon (C) is partially replaced by both boron (B) and nitrogen (N). The carbon compound has the formula $BC_3N$.

The above objects are also fulfilled by an embodiment of a secondary battery comprising a positive electrode, an electrolyte and a negative electrode which is capable of intercalating lithium reversibly, wherein the negative electrode is a carbon compound having a crystal structure of a graphite in which carbon (C) is partially replaced by boron (B). The carbon compound has the formula $BC_3$.

In the above embodiment of the secondary battery, the positive electrode material is a metal chalcogen or a metal oxide, such as $FeS_2$, $MoS_2$, $TiS_2$, $LiNiO_2$, $LiMn_2O_3$, $LiFeO_2$, $LiCoO_2$ or $MnO_2$.

For the electrolyte in the above embodiment, a non-aqueous electrolyte or a solid electrolyte is suitable. The non-aqueous electrolyte is composed of an organic solvent and a lithium salt.

The above objects are further fulfilled by a negative electrode in an embodiment of a secondary battery comprised of carbon compound having a crystal structure of a graphite, in which carbon (C) is partially replaced by both boron (B) and nitrogen (N), the carbon compound intercalating lithium reversibly and having a formula $BC_3N$.

The above objects may are also fulfilled by a negative electrode in an embodiment of a secondary battery composed of a carbon compound having a crystal structure of a graphite in which carbon (C) is partially replaced by boron (B) the carbon compound intercalating lithium reversibly and having a formula $BC_3$.

The above objects are also fulfilled by a method for manufacturing a negative electrode for a secondary battery having lithium as an active material. The method comprises the following steps of: mixing boron nitride (BN) with pitch coke in a weight ratio ranging from about 5:95 to about 50:50 to obtain a mixture; heat-treating the mixture under an inert atmosphere such nitrogen gas at a temperature ranging from about 2000° C. to about 3000° C. for a time duration ranging from about 5 hours to about 10 hours to obtain a carbon compound having a crystal structure of graphite. in which carbon (C) is partially replaced by both boron (B) and nitrogen (N).

In the above method, the carbon compound has the formula $BC_3N$.

The above objects further fulfilled by a method for manufacturing a negative electrode for a secondary battery having lithium as an active material. The method comprises the following steps of: mixing either boron (B) or a boron compound with pitch coke in a weight ratio ranging from about 5:95 to about 50:50 to obtain a mixture; and heat-treating the mixture under an inert atmosphere such as nitrogen gas temperature ranging from about 2000° C. to about 3000° C. for a time duration ranging from about 5 hours to about 10 hours to obtain a carbon compound having a crystal structure of graphite, in which carbon (C) is partially replaced by boron (B).

The resulting carbon compound has the formula $BC_3$, and the boron compound may be selected from a group of boron carbide ($B_4C$), boron oxide ($B_2O_3$) and boron halide ($BCl_3$, $BF_3$, $BBr_3$, $BI_3$). Preferably, boron oxide ($B_2O_3$) is mixed with pitch coke in a weight ratio ranging from about 7:93 to about 15:85, with the preferred weight ratio being 10:90.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 2 is a graph showing the relationship between a charge/discharge capacity and a voltage potential of an embodiment of the present invention.

DETAILED DESCRIPTION OF THE PREFERRED EMBODIMENT

Figure 1:
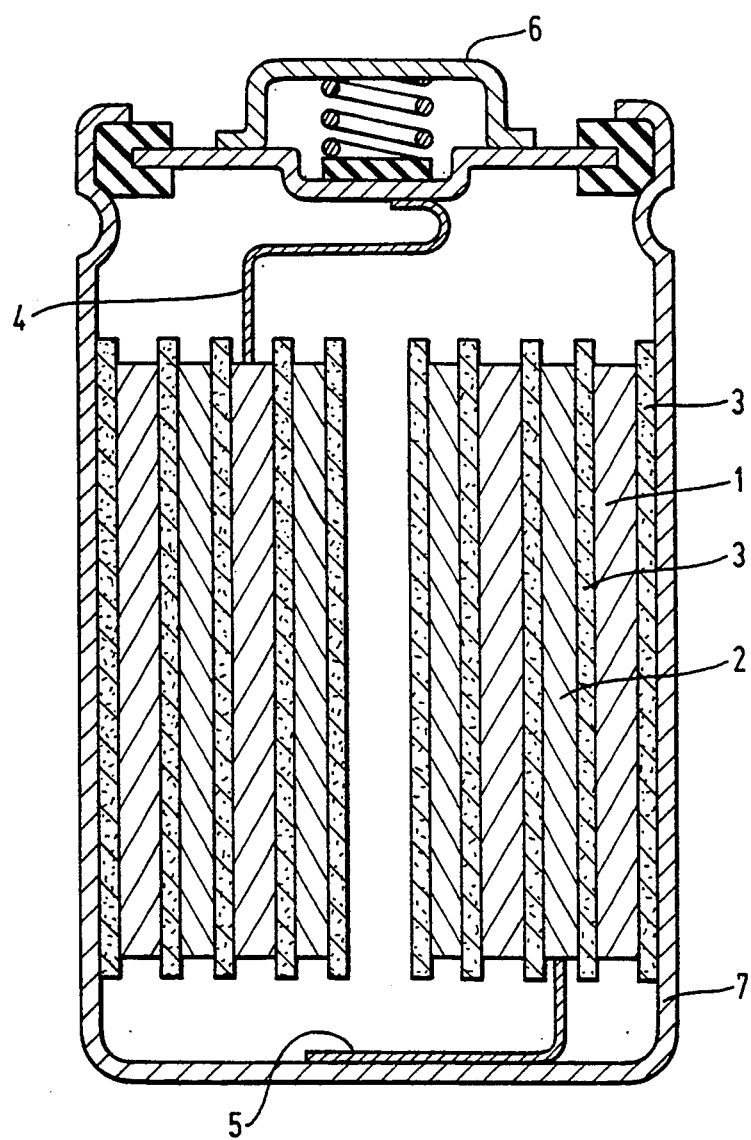
FIG. 1 is a cross-sectional illustration of a secondary battery in accordance with an embodiment of the present invention.

The following detailed descriptions is of the best presently contemplated mode of carrying out the invention. This description is not to be taken in a limiting sense, but is made merely for the purpose of illustrating general principles of embodiments of the invention. The scope of the invention is best defined by the appended claims.

In an embodiment of the present invention, using a carbon compound with part of the carbon elements in a graphite structure replaced by boron (B) or nitrogen (N) for a negative electrode with a large capacity, increases the amount of intercalated lithium. As a result, a secondary battery's capacity is increased.

A crystal structure of the carbon compound in an embodiment of the present invention is suitable as long as the carbon compound has a lower level of crystallinity than coke. For use in an embodiment of the present invention, the carbon compound should have a value of "Lc" less than 150 Å and a value of "d" more than 3.37 Å. In a preferred embodiment, the value of "Lc" is less than 20 Å and the value of "d" is more than 3.40 Å, for the negative electrode.

In an embodiment of the present invention, the carbon compound has a high capacity of about 375 mAh/g for the negative electrode. Therefore, the secondary battery using this negative electrode may obtain a 500 mAh to 600 mAh discharge capacity in an AA battery size. Thus, the secondary battery provides a substantially higher discharge capability than the prior art battery discharge capacity of 350 mAh to 400 mAh.

In the preferred embodiments, the carbon compound is mixed with a binder, such as polytetrafluoroethylene (PTFE), polyvinylindene fluoride (PVdF) or the like, to obtain a mixture. The mixture is then pressed onto a conductive plate for use as a negative electrode.

On the other hand, in embodiments of the present invention, a suitable material for the positive electrode may be a metal chalcogen ($FeS_2$, $MoS_2$, $TiS_2$ or the like) or metal oxide ($LiNiO_2$, $LiMn_2O_3$, $LiFeO_2$, $LiCoO_2$, $MnO_2$ or the like). These materials are mixed with a binder and a conductive agent to obtain a mixture, which is then used for the positive electrode. The conductive agent may include acetylene black, KETJEN BLACK, coke, artificial graphite, natural graphite and kish graphite. KETJEN BLACK is produced by KETJEN BLACK INTERNATIONAL COMPANY.

In preferred embodiments, a non-aqueous electrolyte is used. The non-aqueous electrolyte comprises an organic solvent, such as EC, PC, $\gamma$-BL, DMC, DME, DEC or a combination mixture, with a lithium salt, such as $LiPF_6$, $LiClO_4$, $LiBF_4$, $LiCF_3SO_3$, $LiAsF_6$ or the like. In further embodiments, a solid electrolyte such as LiI, PEO added to $LiPF_6$, $LiClO_4$, $LiBF_4$, $LiCF_3SO_3$, $LiAsF_6$, or the like is suitable. Using such solid electrolytes, provides a high quality battery which is maintenance free because leakage of the electrolyte is prevented.

Further embodied in the present invention is a manufacturing method that mixes boron nitride (BN) with pitch coke. The mixture is heat-treated under an atmosphere of nitrogen gas in a temperature ranging from about 2000° C. to about 3000° C. The reason for this temperature range is that the carbon compound represented by the formula $BC_3N$ is not formed under reaction temperatures of less than about 2000° C. while formed $BC_3N$ is broken down under reaction temperatures of more than about 3000° C. Therefore, the temperature ranging from about 2000° C. to about 3000° C. is chosen for the manufacturing method.

In a second manufacturing method, after mixing either boron (B) or a boron compound with pitch coke, the mixture is heat-treated under an atmosphere of nitrogen gas in a temperature ranging from about 2000° C. to about 3000° C. The reason for this is that reaction temperatures of more than about 2000° C. causes boron to intrude into a carbon structure, while setting the reaction temperatures less than about 3000° C. prevents the evaporation of carbon (C) and boron (B) and a decomposition from a carbon compound represented by the formula $BC_3$

FIRST EMBODIMENT

A secondary battery "A" of the present invention is prepared:

A preparation of a positive electrode is described below. A material of $LiCoO_2$ for the positive electrode is mixed with acetylene black, a conductive agent, and polytetrafluoroethylene (PTFE), a binder, in a weight ratio of 90:5:5 to obtain a mixture. The mixture is kneaded and then pressed onto a conductive plate of thin aluminum to obtain an electrode plate. Next, the electrode plate is heat-treated at a temperature of 250° C. for 2 hours under a vacuum condition, to prepare the positive electrode.

Preparation of a negative electrode is described below. Boron nitride (BN) and pitch coke (Lc=14 Å d=3.41 Å) are mixed in a weight ratio of 30:70, and heat-treated under a nitrogen atmosphere at a temperature of 2000° C. for 16 hours. The resulting carbon compound is presented by a formula $BC_3N$ (Lc=300 Å, d=3.90). Identification of the carbon compound is carried out by elementary analysis, where the carbon compound is burned at the temperature of 2500° C. under an air atmosphere. The burning provides material for a quantitative analysis of the generated gases, nitrogen dioxide ($NO_2$), carbon dioxide ($CO_2$), carbon monoxide (CO) and diboron trioxide ($B_2O_3$).

The acceptable carbon compound is mixed with a PTFE binder in a ratio of 95:5 to obtain a mixture for the negative electrode. The mixture is pressed onto a current collector comprising a thin aluminum plate to obtain an electrode plate for the negative electrode. Next, the electrode plate is heated under a vacuum condition at a temperature of 250° C. for 2 hours, wherein the negative electrode for the secondary battery "A" is formed.

The electrolyte is an organic solvent, which is comprised by a solvent mixture of ethylene carbonate (EC) and dimethyl carbonate (DMC) added to a lithium salt ($LiPF_6$) in a amount of 1 mol/l, wherein the electrolyte for the secondary battery "A" is obtained. In the electrolyte, the volume ratio of EC:DMC is set at 1:1.

The above positive electrode, the negative electrode and the electrolyte are combined with a separator and a case, wherein the secondary battery "A" is produced. The battery "A" typically has a cylindrical shape with a 14.22 mm diameter and a 50 mm height. The separator typically is composed of an ion permeative porous thin film of polypropylene or the like.

A sectional diagram of the battery "A" of the present invention is shown in FIG.1. In FIG. 1, 1 is the positive electrode, 2 is the negative electrode and 3 is the separator. The positive electrode 1 and the negative electrode 2 are separated by the separator 3, which is impregnated with an electrolyte. The positive electrode 1, the negative electrode 2 and the separator 3 are spiraled and put into the outer case 7. The positive electrode 1 is connected to the positive terminal 6 through a lead plate 4 and the negative electrode 2 is connected to the outer case 7 through a lead plate 5, respectively, wherein chemical energy generated in the battery "A" produces electrical energy.

SECOND EMBODIMENT

A secondary battery "B" of the present invention is prepared:

A second embodiment is obtained by changing the carbon compound of the battery "A". In preparation of the negative electrode, boron carbide ($B_4C$) and pitch coke are mixed in a weight ratio of 10:90 and heat-treated under a nitrogen atmosphere at a temperature of approximately 2400° C. for 16 hours. A carbon compound represented by a formula $BC_3$ (Lc=430 Å, d=3.78) is obtained. Identification of the carbon compound is carried out by an elementary analysis in the same way of the fist embodiment.

The acceptable carbon compound is used for the negative electrode. A secondary battery "B" of the present invention is provided in the same way as that used for battery "A".

A secondary battery "C" for a comparative example is prepared:

The battery "C" uses coke as a negative material. The coke and a PTFE binder are mixed in a weight ratio of 95:5 to obtain a negative electrode, prepared in the same way of the battery "A", wherein the battery "C" for the comparative example is produced.

COMPARISON OF A CHARGE AND DISCHARGE CAPACITY

Negative electrodes for the above described batteries "A" "B" and "C" are prepared, and charge and discharge capacities are tested. In the test, the negative electrode is used as a working electrode, and accordingly, the test is carried out by a tri-electrode method.

FIG. 2 shows charge and discharge characteristics of the negative electrode tested. In FIG.2, the horizontal axis represents the charge and discharge capacity (mAh/g) per 1 gram of material used for the negative electrode, the vertical axis represents a negative electrode potential (V) in contrast with the single electrode potential of $Li^+/Li$.

According to FIG.2, the negative electrodes of battery "A" and "B", have a large discharge capacity (375 mAh/g is obtained) during an interval of increasing the potential to 1 V. On the other hand, the negative electrode of the battery "C" has a small discharge capacity (only 240 mAh/g is obtained). Therefore, batteries "A" and "B" have large discharge capacities from the materials used for negative electrodes. Further, the capability of reversibly intercalating lithium is improved and capacities of the batteries can be increased.

In the above described embodiments, the type of the batteries shown is a cylindrical type. However, it is understood that a coin shaped battery or flat shaped battery are available as embodiments of the present invention.

While the description above refers to particular embodiments of the present invention, it will be understood that many modifications may be made without departing from the spirit thereof. The accompanying claims are intended to cover such modifications as would fall within the true scope and spirit of the patent invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A secondary battery comprising:
   a positive electrode;
   an electrolyte; and
   a negative electrode which is capable of intercalating lithium reversibly;
   wherein said negative electrode comprises a carbon compound having a crystal structure of graphite in which carbon (C) is partially replaced by both boron (B) and nitrogen (N), said carbon compound having the formula $BC_3N$.

2. A secondary battery according to claim 1, wherein said positive electrode comprises a material selected from the group consisting of a metal chalcogen and a metal oxide.

3. A secondary battery according to claim 2, wherein said material is selected from the group consisting of $FeS_2$, $MoS_2$, $TiS_2$, $LiNiO_2$, $LiMn_2O_3$, $LiFeO_2$, $LiCoO_2$ and $MnO_2$.

4. A secondary battery according to claim 1, wherein said electrolyte is a non-aqueous electrolyte comprised of an organic solvent and a lithium salt.

5. A secondary battery according to claim 1, wherein said electrolyte is a solid electrolyte.

6. A negative electrode for a secondary battery, comprising a carbon compound having a crystal structure of graphite in which carbon (C) is partially replaced by both boron (B) and nitrogen (N), said carbon compound being capable of intercalating lithium reversibly and having the formula $BC_3N$.

7. A method for manufacturing a negative electrode for a secondary battery having lithium as an active material, said method comprising the steps of:
   mixing boron nitride (BN) with pitch coke in a weight ratio ranging from about 5:95 to about 50:50 to obtain a mixture; and
   heat-treating said mixture under an inert atmosphere at a temperature ranging from about 2000° C. to about 3000° C. for a time duration ranging from about 5 hours to about 10 hours to obtain a carbon compound having a crystal structure of graphite in which carbon (C) is partially replaced by both boron (B) and nitrogen (N).

8. A method according to claim 7, wherein said carbon compound has the formula $BC_3N$.

* * * * *